United States Patent [19]

Dandliker et al.

[11] 3,922,093
[45] Nov. 25, 1975

[54] DEVICE FOR MEASURING THE ROUGHNESS OF A SURFACE

[75] Inventors: Rene Dandliker; Francois M. Mottier, both of Oberrohrdorf, Switzerland

[73] Assignee: BBC Brown, Boveri & Cie., AG, Baden, Switzerland

[22] Filed: Nov. 16, 1973

[21] Appl. No.: 416,649

[30] Foreign Application Priority Data
Nov. 24, 1972 Switzerland...................... 17073/72

[52] U.S. Cl....... 356/120; 178/DIG. 37; 250/222 R; 250/571; 356/200; 356/212; 356/237
[51] Int. Cl.².......................................... G01B 11/30
[58] Field of Search............... 250/222 R, 571, 559; 356/120, 200, 209, 210, 212, 237; 178/DIG. 37

[56] References Cited
UNITED STATES PATENTS

| 2,246,501 | 6/1941 | Bradner et al................. 356/212 X |
| 2,446,628 | 8/1948 | Brown............................ 356/120 X |
| 3,176,306 | 3/1965 | Burns............................. 356/200 X |
| 3,771,880 | 11/1973 | Bennett............................... 356/209 |
| 3,782,827 | 1/1974 | Nisenson et al. ................... 356/120 |
| 3,790,287 | 2/1974 | Cuthbert et al..................... 356/120 |
| 3,804,521 | 4/1974 | Sprague ......................... 356/120 X |

Primary Examiner—Paul L. Gensler
Attorney, Agent, or Firm—Oblon, Fisher, Spivak, McClelland & Maier

[57] ABSTRACT

An apparatus is disclosed for measuring the roughness of a surface with improved accuracy. The apparatus, several embodiments of which are disclosed, includes a device for illuminating a surface being studied and a photosensitive detector for determining the maximum intensity of light reflected on the surface. Apparatus is also provided for detemining two points at which the intensity of the reflected light has fallen to a selected fraction of its maximum intensity. The distance between these two points is then measured along the intersection of the plane of incidence of the illuminating beam with a plane perpendicular to the direction of specular reflection. This distance provides an accurate quantitative measure of the roughness of the surface being studied.

17 Claims, 5 Drawing Figures

3,922,093

DEVICE FOR MEASURING THE ROUGHNESS OF A SURFACE

BACKGROUND OF THE INVENTION

1. Field of the Invention

The present invention relates to a device for measuring the roughness of a surface, whereby the surface is illuminated with a light beam and the spatial distribution of intensity of the reflected light is measured photoelectrically.

2. Description of the Prior Art

Such measuring devices have considerable importance in the manufacture of paper, since its surface roughness, or as complementary concept, its surface smoothness determines its imprintability.

Devices for measuring roughness or smoothness of surfaces, especially of paper, are therefore already widely known. A survey of them is given e.g., in "Wochenblatt fuer Papier Fabrikation" No. 2 (1970), P. 45. On P. 49 of the cited publication is described a device for indirect measurement of smoothness in the form of a gloss meter. With this gloss meter the surface being tested is illuminated with a collimated light beam, and the luminous intensity of the light reflected at the specular reflection angle is measured photoelectrically. For scientific purposes the angular distribution of the light reflected from the paper's surface would also be measured by means of devices with variable illumination and observation angles.

These known gloss meters however have the disadvantage of being very inaccurate. They are also quite tedious to use in practice, since only analog signals can be obtained as the measure of the roughness.

SUMMARY OF THE INVENTION

It is one object of the present invention therefore to realize a device of the above-described type, which combines high measurement accuracy with simple and versatile practical application.

Another object of this invention is the provision of a novel apparatus for measuring the roughness of a surface with improved accuracy.

Yet another object of this invention is the provision of a novel apparatus for determining the distance between two points at which the intensity of light reflected from a surface has fallen to a selected fraction of its maximum value.

Briefly, these and other objects of the invention are achieved by determining, with a device of the above indicated type conforming to the invention, the maximum intensity $I_{max}$ of the reflected light. The measure of the roughness of the surface is then the distances between two points in the line of intersection $x$ of the plane of incidence of the illuminating light beam with a plane perpendicular to the direction of specular reflection at which the intensity $I$ of the reflected light has fallen to a specified fraction $G$ of the maximum intensity $I_{max}$. The specified fraction $G$ assigned to the said two points is for example 0.5, so that the light intensity at the said two points is equal to $I_{max}/2$. The maximum intensity $I_{max}$ occurs in the direction of specular reflection, i.e., in the direction of reflection from a mirror, which is also called the glancing angle.

The essential idea of the invention is therefore to use as a measure of the roughness of the surface under investigation the half-value width of the core of light scattered in the vicinity of the glancing angle. This half value width is simply and automatically quantitatively determined, in contrast to intensity measurement at the glancing angle as in the above described known gloss meter. Furthermore, it constitutes a very precise measure of the roughness investigated as long as the surface irregularities causing the roughness are statistically distributed. The measurement is independent of the color and/or light absorption of the surface.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
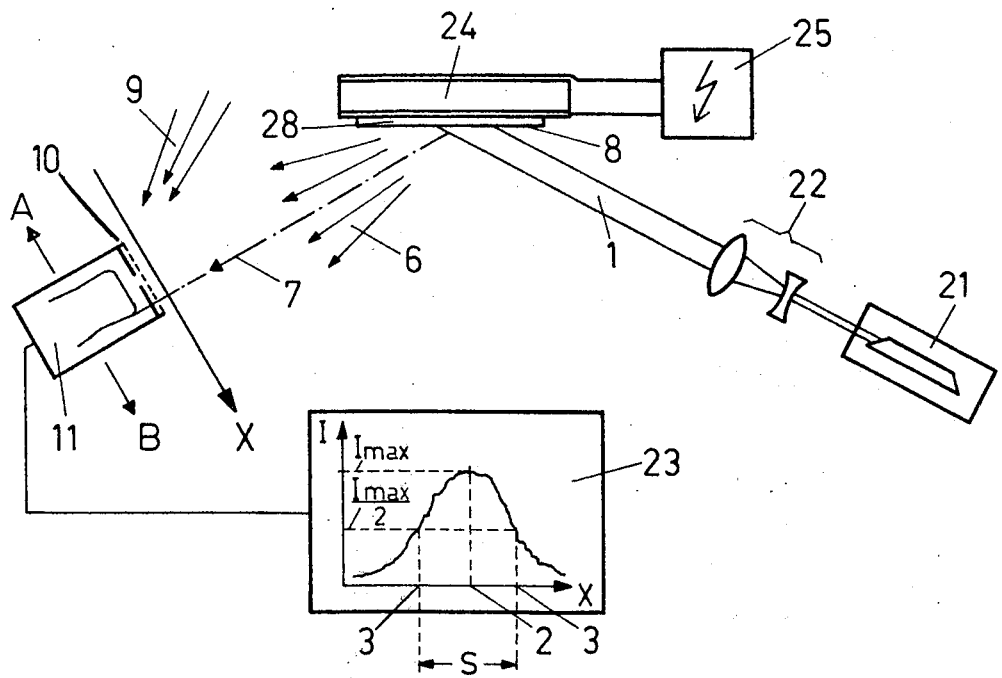
FIG. 1 is a schematic diagram of the present invention wherein a photodetector is utilized.

Referring now to the drawings wherein like reference numerals designate identical or corresponding elements throughout the several views, and more particularly to FIG. 1 thereof, there is provided a light source 21, e.g., a laser, the light beam from which is expanded in a telescope 22 to a parallel or collimated light beam 1 of about 1 to 20 mm in diameter.

A surface 8 under investigation is then illuminated with the light beam 1 at an angle of incidence $\alpha$ (FIG. 1a) of from 50° to 85°. The surface 8 is preferably that of a sheet of paper 28. For testing at the bench the paper is fastened in an electrostatic hold-down device 24, 25 as is best known for example in x–y recorders (e.g. Hewlett Packard).

The illuminating light beam 1 is reflected from the surface 8 as the light 6. The glancing angle $\alpha$ (FIG. 1a) is indicated by the direction 7 of specular reflection.

A photodetector 11 with a small active area, e.g., one or a few millimeters in diameter, is located in the reflected light 6 at least 10 light beam diameters from the surface 8. It is moved in the direction of the arrows A and B along the intersection x of the plane of incidence 4 (FIG. 1a) of the illuminating light beam 1 with a plane 5 (FIG. 1a) perpendicular to the direction 7 of specular reflection at glancing angle $\alpha$, and the photocurrent is thereby recorded as a function of position x.

The result is a diagram 23 in which the light intensity I, which is proportional to the photocurrent, is drawn as a function of position x. As is evident, the curve exhibits a first location 2 in the direction 7 at which the intensity has a maximum value $I_{max}$. There are in addition two second locations 3 at which the intensity has fallen to a certain fraction G, here 0.5 or $I_{max}/2$.

The separation s of the two locations 3 is then the measure of the roughness of the surface 8.

An advantageous refinement is to use a light source 21 of monochromatic light and to place an interference filter 10 between the detector 11 and the light 6. The disturbing influence of ambient light 9 is thus eliminated.

Figure 1A:
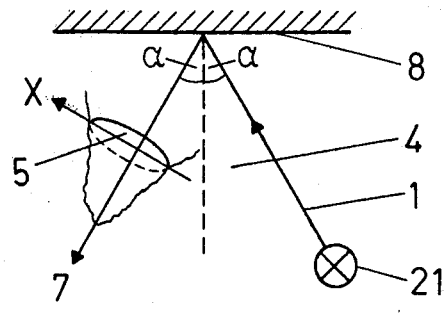
FIG. 1a is a general diagram of light reflectivity according to the present invention to show measuring locations.
Figure 2:
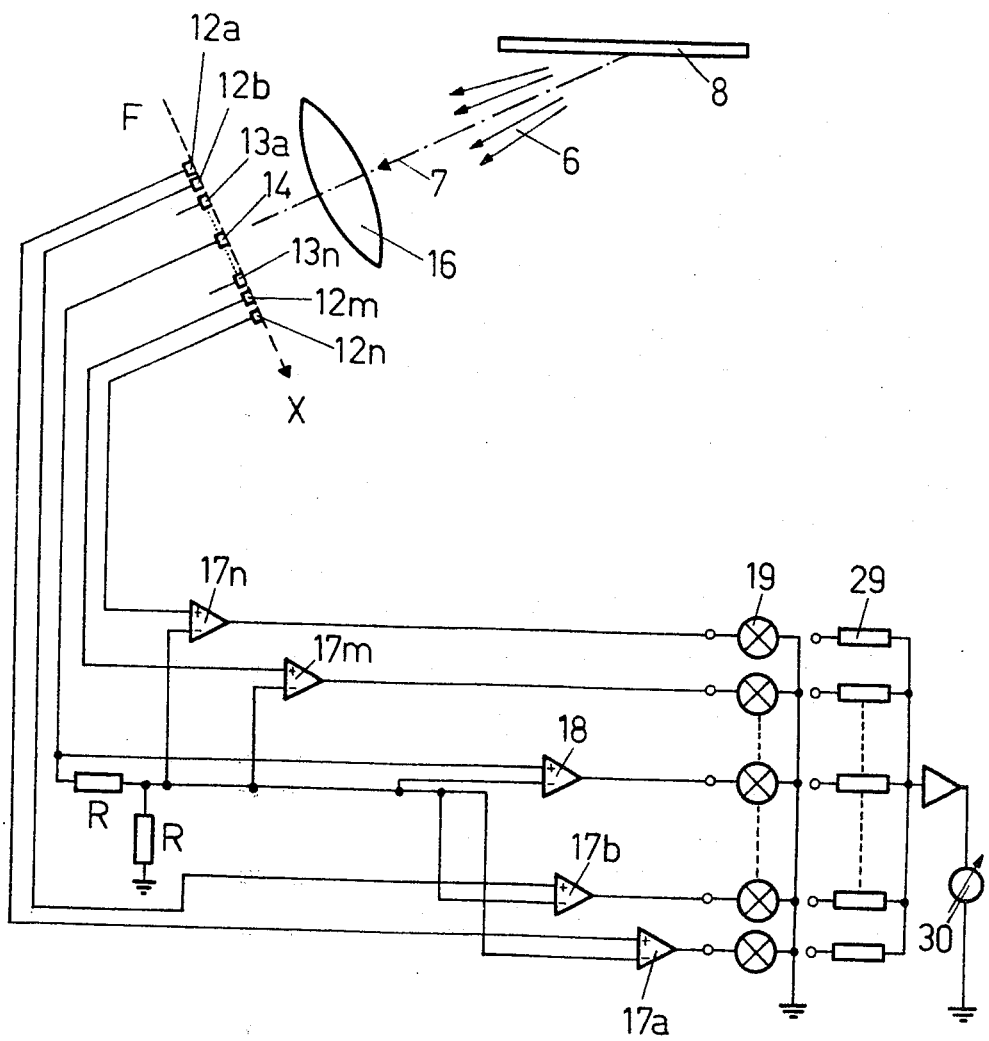
FIG. 2 is a schematic block diagram of another arrangement according to the present invention wherein a chain of photodetectors is utilized.

In FIG. 2 is shown another arrangement for illumination of the surface 8 similar to that shown in FIG. 1 or FIG. 1a. Here however, there is further provided a converging lens 16 in the focal plane F of which is located a chain of photodetectors 12a, 12b ... 12m, 12n, 13a ... 13m and 14. The chain is aligned in the direction of the intersection $x$ defined above with reference to FIG. 1a. At the point where this intersection $x$ lies in the direction 7 of specular reflection there occurs the maximum intensity $I_{max}$ of the light 6, which is measured by photodetector 14, e.g. a photodiode.

The outputs of the photodetectors 12a ... 14 are connected in the manner shown with bistable electronic flip-flops 17a, 17b ... 17m, 17n ... 18 in the form of comparators. Further, the output of the photodetector 14 is connected to a voltage divider R—R at the top of which the value $I_{max}/2$ appears. The comparator outputs are connected to lamps 19. Instead of these, resistors 29 could be connected to the comparators and, by way of an amplifier, to a meter.

In the arrangement of FIG. 2 the intensity of the light 6 in the plane F at the locations of photodetectors 13a ... 14 ... 13n is greater than or equal to, and at photodetectors 12a, 12b, ... 12m, 12n less than $I_{max}/2$. Thus the lamps 19 connected to photodetectors 13a ... 14 . .. 13n light up while those connected to photodetectors 12a, 12b ... 12m, 12n remain dark. The number of lit lamps 19 is then the measure of the roughness of surface 8.

If instead of the lamps 19, resistors 29 with a meter 30 are connected to the comparators, then a current flows through each resistor corresponding to a lit lamp and none flows through the rest. Then the reading of the meter 30, which is proportional to the sum of the currents through the resistors 29, is the measure of the roughness of the surface 8.

The chain of photodetectors 12a ... 14 need not consist of just a single row. Indeed it is advantageous to arrange several rows side-by-side in a manner not illustrated. This makes the arrangement insensitive to any variation of the direction 7 and with it the location of the intensity maximum $I_{max}$.

Figure 3:
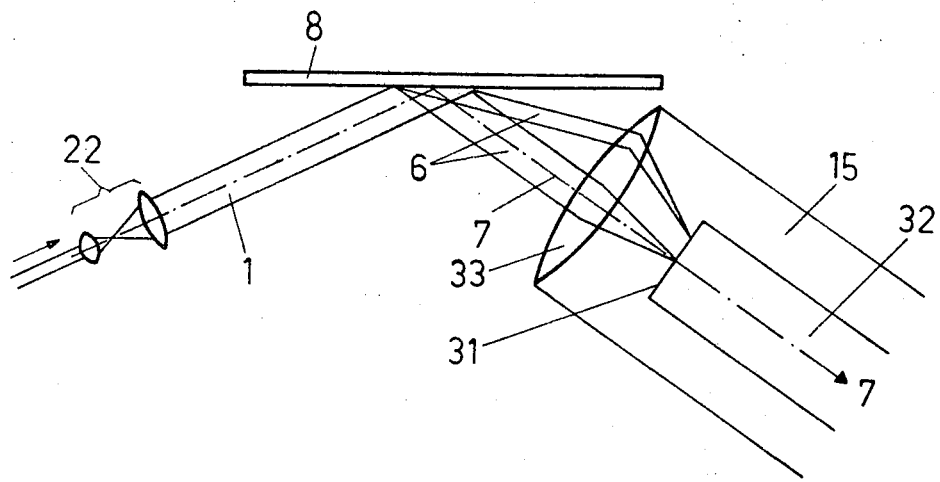
FIG. 3 is a schematic diagram of another arrangement according to the present invention wherein a TV camera is used as a photodetector; and, FIG. 4 is a schematic illustration of the scanning of the roughness of a surface under investigation using a TV camera as in the arrangement of FIG. 3.

FIG. 3 shows a photodetector in the form of a TV camera 15, e.g., a Vidikon 32. The surface 8 being tested for roughness is again (as in FIG. 1 or 1a) illuminated with a light beam 1 expanded and collimated in a telescope 22. The optics 33 of the TV camera 15 are focussed at infinity so that the light-sensitive screen 31 of the Vidikon 32 lies in the focal plane of the optics 33. The parallel light beam 6 reflected from surface 8 is therefore focussed on the Vidikon as shown.

The scanning lines 20 (FIG. 4) of the TV camera 15 is adjusted to be perpendicular to the plane of incidence 4 (FIG. 1a) of the illuminating light beam 1.

The measurement process is then to determine with a peak-value detector, not shown, the value $I_{max}$ of the maximum light intensity encountered in the scanned image in the first half-frame of the interlacescan operated Vidikon 32. Thereby an area is scanned which is greater than the scattered-light ellipse 26 shown in FIG. 4, which is produced by the imaging of the light of beam 1 scattered or reflected by the surface 8 through the optics 33 of TV camera 15. The number 27 denotes a spot of maximum light intensity $I_{max}$ which lies in the direction of specular reflection.

The value $I_{max}$ obtained is then stored, and during the second half-frame, the number N of the scan lines 20 is counted in which the intensity I exceeds a certain fraction G, e.g., half, of the stored value $I_{max}$. The number N thus determined is a direct measure of the roughness of the paper.

The signal proportional to N available at the output of the TV camera can be used further in various ways. For example it can drive a luminous digital read-out. It can, however, also drive an analog indicator, e.g., a pointer instrument.

Since the signal of TV camera 15 indicating the number N of scan lines 20 in which an intensity above $I_{max}/2$ occurs is usually available in binary-decimal code anyway, this signal can also be used to great advantage for control or regulation of the paper-making process.

The arrangement shown in FIG. 3 is particularly advantageous for the testing of moving paper webs.

Figure 4:
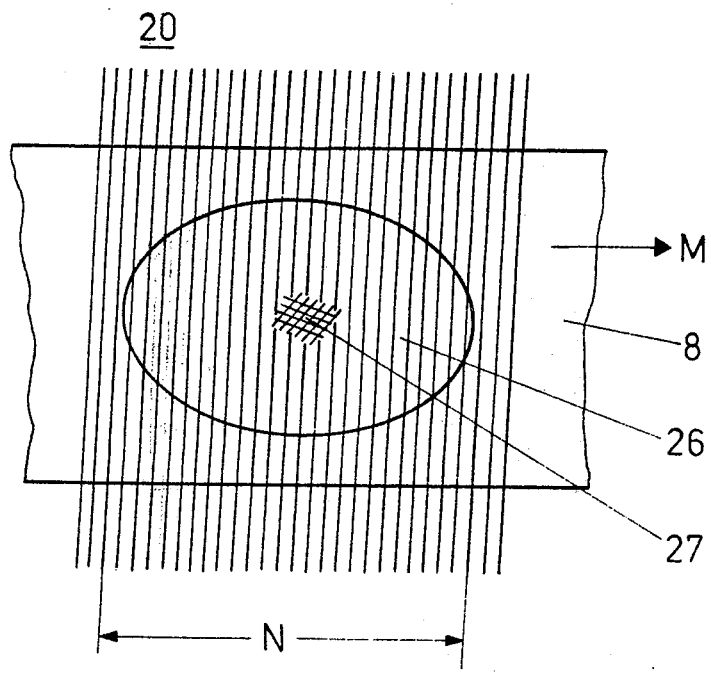

The motion of the paper web with the surface 8 is indicated in FIG. 4 by the arrow M. Obviously, care must be taken that the paper web is conducted past the point of illumination by light beam 1 in such a way that its motion does not produce too great spatial variations of the plane in which the web moves, so that the scattered-light ellipse does not move out of the scanning field of the TV camera 15. This is achieved, e.g., by choosing the spot to be illuminated right on a roller or between two closely spaced rollers.

In the manner illustrated, only the average roughness of the moving surface 8 over about 2 – 4 scan frames, i.e. over 80 to 160 msec., is indicated. If the roughness of the moving paper web at separate points is desired, then the laser producing the illuminating light beam can be pulsed and the measured values stored and/or output sequentially. In this way rapid fluctuations of the surface roughness can be detected. The duration of an illumination pulse can be significantly less than the time for two half frames since the light-sensitive screen of the Vidikon stores the information until it is read by the electron beam.

The advantages of the arrangements according to the invention as compared with the state-of-the-art, quite generally are, among others, that the roughness over a greater area is measured, this area is selectable, e.g., between 1 and 300 mm$^2$, a real-time signal is produced that is accordingly suited for use in a process controller, and the measurement requires no manipulation.

The advantages of the arrangement of FIGS. 3 and 4 in particular are, among others, that the detector exhibits a high light-sensitivity because of the integrating capability of the photoconducting screen of the Vidikon, statistical variations in roughness, which are not of interest, are averaged out by this integrating capability, digital accuracy is inherent in the arrangement, the arrangement is insensitive to displacements of the scattered-light ellipse, as long as the latter is intercepted by the Vidikon, and the cost of the system is very favorable since there are available many inexpensive TV cameras for industrial applications.

In addition to its use in the production and/or finishing of paper with respect to its imprintability, the invention can also be employed in the production and/or finishing of plastic film and metal foil.

Obviously, numerous additional modifications and variations of the present invention are possible in light

What is claimed as new and desired to be secured by Letters Patent of the United States is:

1. A method for measuring the roughness of a surface where the surface is illuminated with a light beam and where the spatial distribution of the intensity of the reflected light is photoelectrically measured comprising:
   determining the intensity maximum of the reflected light;
   determining two points at which the intensity of the reflected light has fallen to a selected fraction of the intensity maximum; and
   measuring the distance between the two points along the intersection of the plane of incidence of the illuminating light beam with a plane perpendicular to the direction of the specular reflection, the distance providing a measure of the surface roughness.

2. A method as in claim 1 wherein the selected fraction is 0.5.

3. A method as in claim 1 wherein the surface is illuminated with a collimated light beam.

4. A method as in claim 1 wherein ambient light is shielded from the photoelectric measurement and the surface is illuminated with monochromatic light.

5. A method as in claim 1 wherein the illuminating light beam is collimated to a diameter of from 1 to 20 mm and the beam is projected on the surface at an angle of from 50° to 85°.

6. A method as in claim 1 wherein the situs of the photoelectric measurement is moved along the intersection through the reflected light whereby the spatial variation in the intensity of the reflected light is measured and the distance between the two points is obtained.

7. A method as in claim 1 wherein the intensity distribution of the reflected light is determined by a chain of photodetectors positioned along the intersection.

8. A method as in claim 1 wherein the intensity distribution of the reflected light is determined by a TV camera focussed at infinity and positioned in the path of light reflected in the direction of specular reflection, the TV camera is scanned so that the direction of the scanning lines is perpendicular to the plane of incidence of the illuminating light beam, the value of the maximum intensity of the reflected light during the first half frame is stored and the number of scanning lines in which the scanned image includes a light intensity greater than the selected fraction is determined during the second half frame.

9. A method as in claim 5 wherein the intensity distribution of the reflected light is measured on a circular surface having a diameter of from 0.2 to 4.0 mm.

10. A method as in claim 6 wherein the light beam for illuminating the surface is provided by a laser.

11. A method as in claim 7 wherein the reflected light is passed through a converging lens and wherein the chain of photodetectors lies in the focal plane of the converging lens.

12. A method as in claim 7 wherein the intensity distribution of the reflected light is further determined by electronic flip-flops coupled to the photodetectors and lamps coupled to the electronic flip-flops so that the lamps are turned on if the intensity of the reflected light is greater than the selected fraction at a particular photodetector.

13. A method as in claim 7 wherein the intensity distribution of the reflected light is further determined by electronic flip-flops coupled to the photodetectors, current is generated proportional to the number of photodetectors at which the intensity of the reflected light is greater than the selected fraction and the proportional current is transmitted to a responsive pointer instrument.

14. A method as in claim 8 wherein the intensity maximum during the first frame half is determined through the use of a peak value detector.

15. A method as in claim 8 wherein a digital signal proportional to the number of scanning lines in which the scanned image includes a light intensity greater than the selected fraction is provided by the TV camera and a luminous readout coupled thereto.

16. A method as in claim 8 wherein an analog signal proportional to the number of scanning lines in which the scanned image includes a light intensity greater than the selected fraction is provided by the TV camera and a pointer meter coupled thereto.

17. A method as in claim 8 wherein the illuminating light beam is pulsed so that the duration of each illuminating pulse is less than the time required for the TV camera to scan through two half frames.

* * * * *